Aug. 19, 1969     G. BJORNSON     3,462,318
HIGH TEMPERATURE ZIRCONIA COATED THERMOCOUPLE
Filed April 5, 1965
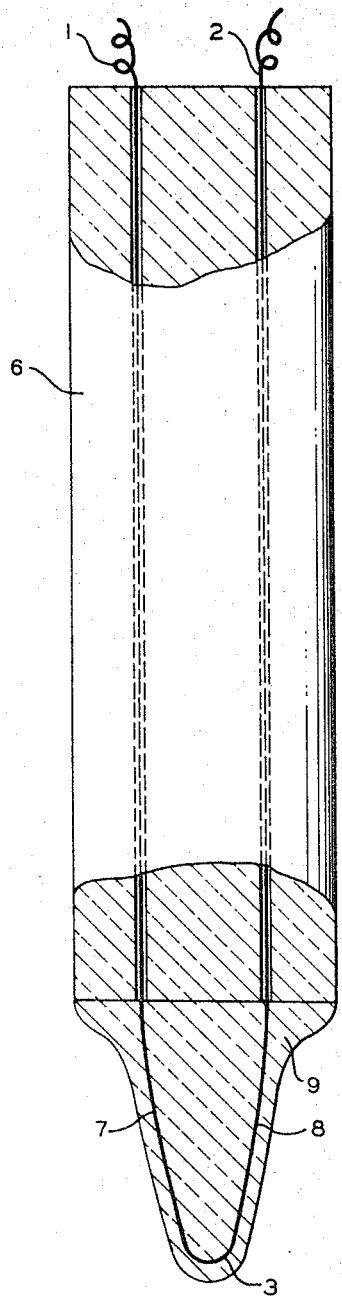
INVENTOR
GEIR BJORNSON
BY
ATTORNEYS

United States Patent Office 3,462,318
Patented Aug. 19, 1969

3,462,318
HIGH TEMPERATURE ZIRCONIA COATED
THERMOCOUPLE
Geir Bjornson, Bartlesville, Okla., assignor to Phillips
Petroleum Company, a corporation of Delaware
Filed Apr. 5, 1965, Ser. No. 445,641
Int. Cl. H01v 1/14
U.S. Cl. 136—233           3 Claims

ABSTRACT OF THE DISCLOSURE

A thermocouple that accurately senses temperatures up to at least 3900° F. comprising a thermocouple element and a coating thereon which consists essentially of zirconia and which was applied thereto by plasma spraying.

---

This invention relates to a method for making a high temperature sensing thermocouple and the product thereof.

Heretofore, the sensitive junction of a thermocouple has been protected from high temperature, attack by chemicals, and other types of deterioration by utilizing a number of protective devices which vary from inert gas atmospheres to intimate ceramic coatings. The use of conventionally applied solid materials, such as refractory materials, as coatings for thermocouple junctions has met with success up to temperatures of about 2000° F. However, such coatings have not proved to maintain the temperature sensing function of the thermocouple reliable at temperatures substantially above 2000° F., e.g., about 3000° F. and higher, since these coatings tend to be electrically conductive at these elevated temperatures to an extent which causes electrical shorting of the thermocouple and therefore inaccurate temperature sensing of same. Consequently, to measure temperatures substantially above 2000° F. and in the presence of an invironment which might cause deterioration of the thermocouple, elaborate shielding techniques are used which greatly increase the cost and reduce the sensitivity and reliability of the thermocouple. For example, a high temperature thermocouple is sometimes incased in a hollow protective sleeve which is filled with an inert gas.

Quite surprisingly, it has now been found that a thermocouple which accurately senses and transmits to suitable recording instruments an electrical signal representative of a temperature up to at least 3900 to 4300° F. can be formed by coating at least the temperature sensitive portion of the thermocouple element by plasma spraying thereon a material consisting essentially of zirconia.

Such a thermocouple is not only capable of functioning at high temperatures under difficult conditions, but is also sufficiently sensitive and convenient to operate satisfactorily at temperatures as low as 30° F. in mild environments, thus providing for outstandingly versatile operation. The invention thermocouple is particularly advantageous, however, in the measurement of temperatures above 3000° F. in corrosive atmospheres.

The high temperature thermocouple of this invention therefore comprises a thermocouple element or junction having a coating thereon which consists essentially of zirconia and which is applied thereto by plasma spraying. The thermocouple junction itself, of course, comprises a couple capable of registering the highest temperatures which are to be measured, neglecting the corrosive atmosphere aspect.

Accordingly, it is an object of this invention to provide an improved method of making high temperature thermocouples. It is another object of this invention to provide an improved high temperature thermocouple.

Other aspects, objects, and the several advantages of the invention will be apparent to those skilled in the art from the description, the drawing and the appended claims.

The drawing shows a longitudinal section of a thermocouple embodying the principles of this invention.

In the drawing, there is shown a conventional thermocouple formed of two thermocouple conductors 1 and 2 joined to form a temperature sensitive junction at 3 in a conventional manner such as by butt welding. Electrical conductors (not shown), preferably formed of materials corresponding to the materials from which thermocouple conductors 1 and 2 are made, are connected in a conventional manner, for example through a reference junction (not shown), to conventional registering and/or recording devices such as a milliammeter (not shown).

Thermocouple conductors 1 and 2 are protected by conventional, double bore, pre-formed insulator 6 which can be made from any suitable and known material such as silica, alumina, titania, and the like, and mixtures of two or more of such materials. The temperature sensitive junction 3 and lengths 7 and 8 of the thermocouple conductors 1 and 2, all of which will be subjected to the corrosive atmosphere and to the highest temperatures experienced by the thermocouple, are coated with a plasma-sprayed coating 9 consisting essentially of zirconia. Lengths 7 and 8 will vary depending upon the magnitude of the temperature to which the thermocouple is to be exposed. The plasma sprayed coating 9 completely surrounds lengths 7 and 8 and junction 3 thereby forming complete protection of these elements.

Since the theoretical aspects of this invention are presently not completely understood it is not desired to be bound thereby; however, it is believed at present that at least part of the reason for the high temperature sensing reliability of the thermocouple of this invention is that the plasma spraying technique produces an intermediate resistance-barrier layer between the zirconia and lengths 7 and 8 of thermocouple conductors 1 and 2. It is this layer which is believed to, at least in part, prevent or hinder electrical conduction from taking place through the zirconia at high temperatures.

The thermocouple conductors can be formed from any conventional thermocouple materials such as Chromel-Alumel, tungsten-rhenium, iridium-rhenium, platinum-rhodium, and the like. The present invention significantly extends the utility of these thermocouples since they can now be used in a variety of high temperature systems and a variety of atmospheres, some extremely corrosive, which can range from oxygen-containing to and/or including carbon-and/or hydrocarbon-containing atmospheres without the use of complex and limiting shielding devices heretofore necessary.

According to this invention at least the thermocouple junction, i.e. the temperature sensitive portion of the thermocouple, is coated by utilizing conventional plasma spraying techniques to spray a thin film of a material consisting essentially of zirconia thereon. Although the thickness of the zirconia film can vary considerably, it is desirable to use the thinnest film possible which will still effectively seal the junction area since thin films are less subject to thermal shock than their heavier counterparts. Generally, the films of this invention will range in thickness from about 5 to about 200 thousandths of an inch.

The plasma spraying technique employed in this invention can be any conventional operation which applies an adhering zirconia coating to the junction by means of a carrier plasma. Such techniques include those which utilize an inert gas such as nitrogen, argon, hydrogen and the like, preferably hydrogen, to form the plasma and to which the zirconia can be fed in the form of a fine powder. After contacting the plasma-containing gas, the powder melts and/or vaporizes such that when it impinges on the substrate to be coated, namely the thermocouple junction zone, it forms a protective adhering coating thereon. In general, any device which will provide a plasma-containing stream of gas having a temperature in the range of from 6,000 to 40,000° F. or even higher and suitable for applying a refractory coating can be employed in this invention. Suitable plasma generators such as an arc plasma generator, an induction plasma generator, and the like, are disclosed in U.S. Patents 2,960,594, 2,922,869 and others.

The effect of elevated temperatures on the conductivity of substantially pure zirconia is shown in the following table wherein the electrical property is set forth in terms of resistivity, which is the reciprocal of conductivity:

TABLE I[1]

| Resistivity, ohm/cm. | Temp., ° F. |
|---|---|
| $1.0 \times 10^6$ | 764 |
| $2.2 \times 10^4$ | 1290 |
| $3.6 \times 10^2$ | 2200 |
| $1 \times 10^0$ | 3600 |

[1] From Zirconium Corporation of America, Technical Data Sheet No. 6, entitled "Zirconium Oxide Physical Properties" and dated May 1962.

From the above table it can be seen that the resistivity of zirconia rapidly decreases and therefore the conductivity rapidly increases with elevated temperatures, a very marked change taking place above 2200° F. The lower resistivity and therefore higher conductivity of zirconia above 2000° F. demonstrates that a thermocouple in contact with zirconia at that temperature will suffer electrical shorting of the thermocouple conductors through the zirconia, thereby rendering the temperature sensing function of that junction inaccurate. The inaccuracy of temperature sensing due to electrical shorting increases significantly with ever increasing temperatures. The typical manifestation of such electrical shorting is the inability of the temperature registering or recording device to which the thermocouple is attached to register higher temperatures notwithstanding further actual increases of temperature experienced by the thermocouple. A thermocouple not formed by plasma spray techniques will provide accurate temperature measurement up to a temperature at which significant shorting occurs and will thereafter not register any higher temperature even though the temperature to which the thermocouple is exposed does, in fact, increase. Generally, this type of electrical shorting manifestation occurs for conventional high temperature thermocouples including those employing zirconia or other coatings which are conductive at temperatures in the neighborhood of about 2000° F.

In view of the above it was completely surprising and unexpected to find that a thermocouple, coated with a plasma-applied film of zirconia, would satisfactorily indicate temperatures as high as 3900° F. and higher.

EXAMPLE

A 97 weight percent tungsten and 3 weight percent rhenium wire and a 75 weight percent tungsten and 25 weight percent rhenium wire were joined to form a thermocouple junction. This junction was coated with subtantially pure zirconia by applying same to the temperature sensitive junction of the two wires and adjacent areas of the wires by a plasma arc torch (Plasmadyne Model No. SG-1, water cooled, 5/16-inch orifice, copper anode and thoriated tungsten cathode) operating at about 600 amps, 34 volts, 2.3 cubic feet per minute argon arc gas, and about 0.7 cubic feet per minute argon gas carrying finely powdered zirconia. A venturi powder feeder was utilized to inject zirconia having a particle size of about 325 mesh into the plasma arc torch. The junction of the thermocouple was coated with an adhering film consisting essentially of zirconia which had a thickness of about 10 to 20 thousandths of an inch.

The upper portions of the thermocouple conductor wires not covered by the plasma sprayed zirconia were contained within a conventional double-bore, pre-formed zirconia insulator. The thermocouple junction was treated by insertion into a tubular chemical reactor. A high temperature, high velocity hydrocarbon-containing stream formed by contacting a hydrocarbon with a high velocity hydrogen plasma stream was passed through the chemical reactor in contact with the thermocouple. The thermocouple readily measured temperatures of about 3900° F. without visual evidence of chemical attack on the junction and without evidence of electrical shorting of the thermocouple. Without the protective coating of the present invention, the unshielded thermocouple is destroyed in that environment at temperatures above about 2000° F.

Thus, it can be seen that the thermocouple of this invention registered temperatures far above those temperatures at which a conventional thermocouple would have ceased registering increases in temperature due to significant electrical shorting and/or environmental deterioration.

Reasonable variations and modifications are possible within the scope of this disclosure without departing from the spirit and scope of the invention.

I claim:

1. A thermocouple that accurately senses temperatures up to at least 3900° F. comprising a thermocouple element having a temperature sensitive junction and a coating on at least said temperature sensitive junction which completely surrounds said junction, which consists essentially of zirconia, and which is applied thereto by plasma spraying.

2. A thermocouple that accurately senses temperatures up to at least 3900° F. comprising a thermocouple element having a temperature sensitive junction and a coating on at least said temperature sensitive junction having a thickness of from about 5 to about 200 thousandths of an inch which completely surrounds said junction, which consists essentially of zirconia, and which is applied by plasma spraying utilizing a plasma to a temperature of at least 6000° F.

3. An accurate high temperature sensing thermocouple comprising a rhenium-tungsten wire thermocouple element having a temperature sensitive junction and a coating on at least said junction having a thickness of from about 10 to about 20 thousandths of an inch which completely surrounds said junction, which consists essentially of zirconia, and which is applied by plasma spraying.

References Cited

UNITED STATES PATENTS

| 3,006,978 | 10/1961 | McGrath | 136—233 |
| 3,197,335 | 7/1965 | Leszynski | 117—105.2 |
| 3,310,423 | 3/1967 | Ingham. | |

WINSTON A. DOUGLAS, Primary Examiner

MELVYN J. ANDREWS, Assistant Examiner